United States Patent [19]

Devers

[11] Patent Number: 5,724,833

[45] Date of Patent: Mar. 10, 1998

[54] CONTROL SCHEME FOR CRYOGENIC CONDENSATION

[75] Inventor: Barnard James Devers, Greenville, Tex.

[73] Assignee: Phillips Petroleum Company, Bartlesville, Okla.

[21] Appl. No.: 764,347

[22] Filed: Dec. 12, 1996

[51] Int. Cl.[6] ........................................... F25J 1/00
[52] U.S. Cl. .......................... 62/625; 62/628; 62/935; 364/501
[58] Field of Search ..................... 62/628, 625, 935; 364/501

[56] References Cited

U.S. PATENT DOCUMENTS

| | | | |
|---|---|---|---|
| 4,172,711 | 10/1979 | Bailey | 62/21 |
| 4,239,517 | 12/1980 | Campell et al. | 62/628 |
| 4,371,426 | 2/1983 | DiBiano et al. | 62/628 |
| 4,498,916 | 2/1985 | Jensen | 62/21 |
| 4,544,452 | 10/1985 | Halliday et al. | 62/628 |
| 4,698,080 | 10/1987 | Gray et al. | 62/21 |
| 5,386,691 | 2/1995 | Bonaquist et al. | 62/25 |

OTHER PUBLICATIONS

Tiptah, B.G.; *Instrument Engineers Handbook, Process Control*, 1985, Chilton Book Co., pp. 941–942.

Primary Examiner—Ronald C. Capossel
Attorney, Agent, or Firm—George E. Bogatie

[57] ABSTRACT

In a cryogenic condensation scheme used for benzene removal in a process for liquefying natural gas, two series connected separation columns are provided with a feed-stream precooled in a heat exchanger to a temperature that will at least condense the benzene component. In the first column, benzene is absorbed and vapor/liquid is separated with the liquid passed to the second column. The second column provides an overhead vapor stream conserved for processing to LNG, and a bottoms stream comprising NGL. The cooling for condensation of gaseous feed in the heat exchanger is controlled by automatically manipulating bypass flow around the heat exchanger responsive to measured vapor flow from the second separation column. Accordingly, the amount of liquid condensed is responsive to the flow rate of vapor withdrawn overhead from the second separation column.

10 Claims, 1 Drawing Sheet

CONTROL SCHEME FOR CRYOGENIC CONDENSATION

The present invention relates to manufacture of liquified natural gas (LNG) from natural gas, and more particularly to method and apparatus for controlling condensation of feed material to a cryogenic separation column included in the LNG liquefaction process.

BACKGROUND OF THE INVENTION

Natural gas liquefaction by cryogenic cooling is practiced at remote natural gas rich locations to convert the natural gas to a transportable liquid for shipment to available markets. In a typical refrigeration process used to cool a process stream of natural gas, a refrigerant such as propane is compressed, then condensed to a liquid and the liquid is passed to a chiller for heat exchange with a natural gas feedstream. The refrigeration cycle is then repeated. Often the cooling medium is more than one external refrigerant, and also a portion or portions of the cold gases or liquid produced in the process. A preferred process is a cascade system, consisting of three chilling cycles using a different refrigerant for each cycle. For example a cascade of propane, ethylene, and methane cycles may be used, where each cycle further reduces the temperature of the natural gas feedstream until the gas liquefies. The subcooled liquid is then flashed or subjected to a reduced pressure, to produce LNG at approximately atmospheric pressure. A highly effective process for the manufacture of LNG from a natural gas stream is illustrated and described in U.S. Pat. No. 4,430,103 which is incorporated herein by reference.

While natural gas predominated in methane, such gases often contain a benzene contaminant along with other heavy hydrocarbon components. For technical and economic reasons it is not necessary to remove impurities such as benzene completely. Reducing its concentration, however, is desirable. Contaminant removal from natural gas may be accomplished by the same type of cooling used in the liquefaction process where the contaminants condense according to their respective condensation temperatures. Except for the fact that the gas must be cooled to a lower temperature to liquefy, as opposed to separating the benzene contaminant, the basic cooling techniques are the same for liquefaction and separation. Accordingly, in respect of residual benzene, it is only necessary to cool the natural gas feedstream to a temperature at which the benzene will condense to a liquid and then separate the liquid from the vapor. This may be accomplished in a cryogenic separation column.

In one such process benzene is removed from a natural gas feedstream by cooling the feedstream to condense the benzene to a liquid state. The thus partially condensed feedstream is provided as an inlet stream to a cryogenic separation column, herein called a benzene absorber, where the benzene is absorbed and the methane vapor is conserved for further processing. In the interest of efficient operation of the LNG manufacture, further condensing of the natural gas feed in the benzene removal column is desirable, including condensing of the heavy hydrocarbon components. Condensed liquid from the benzene absorber is then sent under level control to a reboiled stabilizer column, having external reflux equipment, where methane vapors are separated from liquid. The methane vapors recovered in the stabilizer column are conserved for further processing, and the liquid is provided for natural gas liquids (NGL) sales.

In most partial condensation processes, typical practice involves condensation of a desired portion of the gaseous feedstream by cooling and partially condensing the feedstream in a heat exchanger. The temperature of the partially condensed feedstream exiting the heat exchanger is then controlled to provide the desired quantity of condensate. While this control scheme is technically feasible for the benzene removal column, it presents a problem. This is because any flow, temperature, or composition change in the natural gas feedstream requires a change in the temperature of the partially condensed inlet stream to the benzene absorber. For example, if the controlled temperature of the partially condensed stream is too cold, too much liquid will be condensed and the associated stabilizer will flood. If the partially condensed stream becomes too warm, heavy hydrocarbons will be sent along with the conserved methane vapor from the stabilizer column to colder sections of the plant. This can cause fouling of downstream heat exchangers. Accordingly, close operator monitoring and adjustment of the temperature would be required for good control.

It is an object of this invention to use improved condensation controls that overcome the above-mentioned problems.

Another object of this invention is to use improved control methods, which reduce operator monitoring and intervention.

Yet another object is to improve operating efficiency for benzene removal from a natural gas feedstream.

A more specific object of this invention is to improve stability of liquid levels in two series connected cryogenic separation columns in an LNG process.

SUMMARY OF THE INVENTION

According to this invention, the foregoing and other objectives and advantages are achieved in a method for manipulating flow in a heat exchanger that partially condenses a natural gas feedstream supplied to a first cryogenic separation column. The heat exchanger flow is manipulated in response to the measured flow rate of hydrocarbon vapor withdrawn from a second separation column located adjacent to and downstream from the first cryogenic separation column. The controlled process includes cooling the natural gas feedstream in a heat exchanger to condense at least the benzene contaminant and the heavy hydrocarbon components in the feedstream. The thus partially condensed feedstream is provided as an inlet stream to the first separation column, which is a benzene absorber column. From the benzene absorber column methane vapors are recovered for processing to LNG, and liquid is sent under level control to the second cryogenic separation column. The second column is a reboiled, refluxed stabilizer column that separates hydrocarbon liquid and vapor. The vapor, which is primarily methane, is recovered overhead for further processing to LNG and the liquid, which contains the heavier hydrocarbon components, is recovered in a bottom stream for NGL sales. Control apparatus to carry out the above method includes a flow sensor, such as an orifice meter, operably connected to the overhead vapor withdrawal line of the downstream separator. The thus sensed flow is provided as the measured variable input to a flow controller, with the controller output connected to manipulate flow in a bypass line around the heat exchanger.

The method and apparatus of this invention use a novel combination of controlled and manipulated variables to adjust the quantity of liquid supplied to the benzene absorber column automatically. This control maintains a set flow rate of vapor from the second separation column to be recycled for LNG manufacture. If this controlled flow rate becomes excessive, the flow controller opens the bypass valve that warms the inlet stream to the first separation column and thereby reduces the amount of gaseous feed that is condensed. Conversely, if the vapor flow becomes depleted, the bypass valve is closed thereby increasing the amount of material that is condensed.

Additional objects, advantages and novel features of this invention will become apparent to those skilled in the art from the following description of the preferred embodiment, the appended claims, and the drawings in which:

DETAILED DESCRIPTION OF THE PREFERRED EMBODIMENT

Figure 1:
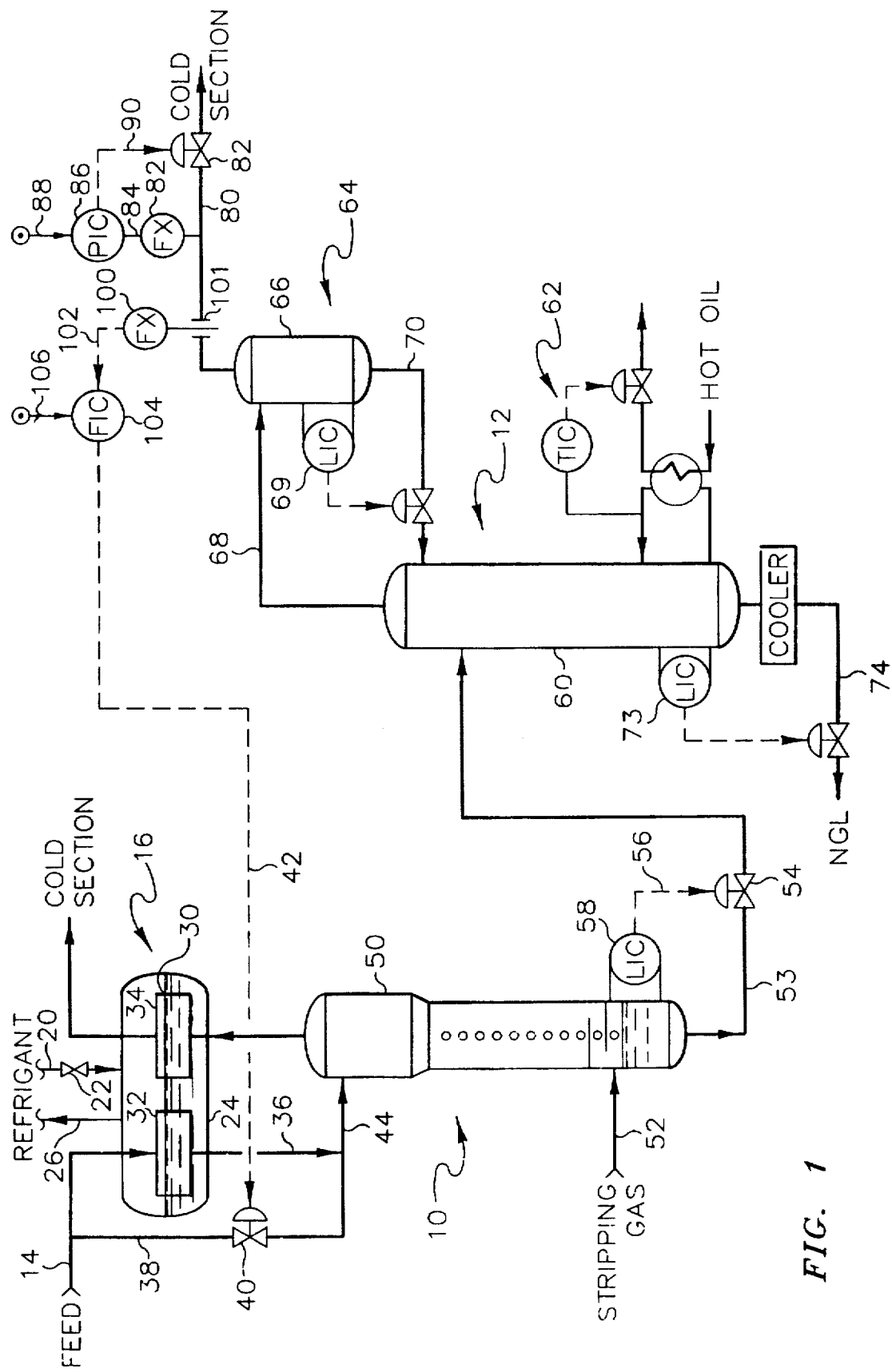
FIG. 1 is a simplified flow diagram illustrating series connected separation columns incorporating a control scheme according to the present invention.

While the present invention is generally applicable to cryogenic condensation systems for contaminant removal, for simplicity and clarity the following description is confined to cryogenic cooling of a natural gas stream to remove benzene. This invention provides a method and means to automatically compensate for changes in flow rate, temperature, or composition of a natural gas feedstream supplied to a cryogenic condensation system that includes two series connected separation columns.

A specific control scheme is set forth in FIG. 1, for the sake of illustration. However, the invention extends to different types of control systems configurations that accomplish the objects of the invention. Lines designated as signal lines, which are shown as dash lines in the drawings, are electrical or pneumatic in this preferred embodiment. Generally the signals provided from any transducer are electric in form. However, the signals provided from flow sensors are generally pneumatic in form. The transducing of these signals is not illustrated for the sake of simplicity because it is well known in the art that if a flow is measured in pneumatic form it must be transduced to electric form if it is to be transmitted in electrical form by a flow transducer.

The invention is also applicable to mechanical, hydraulic or other means for transmitting information. In most control systems, some combination of electrical, pneumatic, or hydraulic signals will be used. However, use of any other type of signal transmission compatible with the process and equipment in use is within the scope of this invention. The proportional-integral-derivative (PID) controller shown in FIG. 1 can use the various modes of control such as proportional, proportional-integral or proportional-integral-derivative. In the preferred embodiment a proportional-integral mode is used. However, any controller having capacity to accept two or more input signals and produce a scaled output signal representative of the comparison of the two input signals is within the scope of the invention.

The scaling of an output signal by a controller is well known in the control systems art. Essentially, the output of a controller can be scaled to represent any desired factor or variable. An example is where a desired temperature and an actual temperature are compared in a controller. The controller output might be a signal representative of a flow rate of some gas necessary to make the desired and actual temperatures equal. On the other hand, the same output signal could be scaled to represent a pressure required to make the desired and actual temperatures equal. If the controller output can range from 0–10 units, then the controller output signal could be scaled so than an output level of 5 units corresponds to 50% or some specified flow rate or some specified temperature. The transducing means used to measure parameters that characterize a process and the various signals generated thereby may take a variety of forms or formats. For example the control elements of this system can be carried out using electrical analog, digital electronic, pneumatic, hydraulic, mechanical, or other similar types of equipment or combinations of such types of equipment. The specific hardware and/or software used in feedback control systems is well known in the field of process plant control. See for example Chemical Engineering's Handbook, 5th Ed., McGraw-Hill, pgs. 22-1 to 22–147.

Referring specifically now to FIG. 1, there is illustrated a simplified flow diagram for two sequentially connected separation columns, generally designated at 10 and 12. A natural gas feedstream is supplied through conduit 14 to a cooling system generally designated at 16. The cooling system 16 is an ethylene chiller. In this chiller the pressure of a liquid ethylene refrigerant, supplied through conduit 20, is reduced as through valve 22 to flash part of the ethylene refrigerant into the heat exchanger shell 24, thus cooling the ethylene liquid. The vapor portion passes through the shell vapor space and exits the shell 24 via conduit 26. The liquid portion is collected in the shell 24 to form a liquid level that is maintained at or slightly above the level illustrated at 30. Liquid in shell 24 is circulated by thermosiphon circulation to contact the cores 32 and 34 to provide cooling for indirect heat exchange with the feed gas in core 32. In the illustrated embodiment flow of natural gas feed through the core 32 will at least be partially condensed. The flow through the core 32 can, however, be partially bypassed through conduit 38 which contains control valve 40. The warm natural gas flowing in conduit 38 can then be blended with the cooled and partially condensed natural gas flowing in conduit 36. Control valve 40 is adjusted responsive to a control signal on line 42, as will be explained more fully hereinafter.

Conduits 36 and 38 are combined to form conduit 44 for introducing partially condensed natural gas feed into the upper section of the vertical, cylindrical vessel, herein called the benzene absorber column designated as reference character 50. In the upper section of the benzene absorber column 50, liquid benzene is absorbed in a material such as propane and heavier hydrocarbons. As the temperature of the feed to column 50 cools further, liquid droplets begin to fall out of the upper absorber section. In the interest of efficient operation of the column 50, a warm dry gas stream flowing in conduit 52 enters the benzene absorber column 50 at the bottom and rises to the top, thus encountering the droplets traveling downward over the trays. The warm dry gas, preferably methane, strips lighter hydrocarbons from the downwardly falling droplets. As the liquid level builds in column 50, liquid is passed to the upper portion of a reboiled stabilizer column 60. This liquid is passed under level control via control valve 54 operably located in conduit 53. Control valve 54 is manipulated responsive to signal 56 that is provided by level controller 58.

In stabilizer column 60 methane vapor is separated from the liquid feed. Heat is supplied to the lower section of column 60 via a reboiler system generally illustrated at 62. External liquid reflux is provided to the upper section of column 60 by a reflux system generally shown at 64. The reflux system includes a drum 66 that receives overhead vapor from column 60 via conduit 68. The vapor is partially condensed to provide liquid reflux sent to column 60 via conduit 70 under level control provided by controller 69. A liquid bottoms product including hydrocarbons heavier than ethane, which is generally referred to as natural gas liquids or merely NGL, is withdrawn via conduit 74 responsive to level controller 73.

The separated methane in the stabilizer column 60 is withdrawn through conduit 80 and recycled to a cold section in the liquefaction process under pressure control provided by pressure controller 86. The pressure of the reflux drum is measured in conduit 80, and pressure transducer 82 operably connected to conduit 80 transmits a signal 84, which is proportional to the actual pressure of drum 66 to pressure controller 86. Controller 86 is also provided with a set point signal 88 which is representative of the desired pressure in drum 66. In response to signals 84 and 88, pressure controller 86 provides an output signal 90 which is scaled to be representative of the position of control valve 82 required to maintain the actual pressure in drum 66 substantially equal to the desired pressure represented by set point signal 88.

The rate of flow of methane vapor in the conduit is also measured. A flow transducer 100 in combination with a flow sensor 101, which is operably located in conduit 80 provides an output signal 102, which is representative of the actual flow rate of vapor in conduit 80. Signal 102 is provided as the process variable input to flow controller 104. Flow controller 104 is also provided with a set point signal 106 representative of the desired flow rate in conduit 80. As illustrated in FIG. 1, set point signals 106 and 88 are manually entered by an operator. These set point signals, however, may be generated in a computer based on calculations involving multiple measured process parameters and/or data stored in computer memory and provided to the respective controllers. In response to signals 102 and 106 flow controller 104 provides an output signal 42 which is responsive to the difference between signals 102 and 106. Signal 42 is scaled to be representative of the position of control valve 40, which is operably located in the heat exchanger bypass conduit 38, required to maintain the actual flow rate in conduit 80 substantially equal to the desired flow rate represented by set point signal 106. Signal 42 is provided from flow controller 104 as the control signal for control valve 40, and control valve 40 is manipulated in response thereto.

For reasons of brevity some conventional auxiliary equipment that would be required in a commercial operation has not been included in the above description, as it would play no part in the explanation of the invention. Such additional equipment might include pumps, additional heat exchangers, additional measurement and control devices, etc.

While the present invention has been described in terms of the presently preferred embodiment, reasonable variations and modifications are possible by those skilled in the art and such modifications and variations are within the scope of the described invention and the appended claims.

That which is claimed:

1. Apparatus for controlling condensation of a gaseous hydrocarbon feedstream predominating in methane and containing heavier hydrocarbon components, and a benzene contaminate, said apparatus comprising:
    (a) heat exchanger means, having a bypass conduit for cooling and partially condensing the feedstream, thereby defining a partially condensed stream;
    (b) a bypass control valve operably located in said bypass conduit for adjusting the portion of said feedstream that bypasses said heat exchanger means;
    (c) a first separation column for receiving said partially condensed stream and for absorbing said benzene contaminant and separating liquid and vapor;
    (d) means for withdrawing an overhead vapor stream from said first separation column;
    (e) a second separation column for receiving a bottoms liquid stream withdrawn from said first separation column, and for separating liquid and vapor;
    (f) first conduit means for withdrawing an overhead vapor stream and a second conduit means for withdrawing a bottoms liquid stream from said second separation column;
    (g) means for establishing a first signal representative of the actual flow rate of vapor in the overhead vapor stream withdrawn from said second separation column in said first conduit means;
    (h) means for establishing a second signal representative of the desired flow rate of vapor in the overhead vapor stream withdrawn from said second separation column;
    (i) means for comparing said first signal and said second signal for establishing a third signal responsive to the difference between said first signal and said second signal, wherein said third signal is scaled to be representative of the position of said bypass control valve required to maintain the actual flow rate in said first conduit, represented by said first signal, substantially equal to the desired flow rate represented by said second signal; and
    (j) means for manipulating said bypass control valve operably located in said bypass conduit in response to said third signal.

2. Apparatus in accordance with claim 1, when said heat exchanger means comprises an ethylene chiller having a shell containing liquid ethylene and cores partially immersed in the ethylene for effecting indirect heat exchange with said feedstream.

3. Apparatus in accordance with claim 1 additionally comprising:
    a pressure control valve operably located in said first conduit means;
    means for establishing a fourth signal representative of the actual pressure of said overhead vapor stream withdrawn from said second separation column in said first conduit means;
    means for establishing a fifth signal representative of the desired pressure of the overhead vapor stream withdrawn from said second separation column in said first conduit means;
    means for comparing said fourth signal and said fifth signal for establishing a sixth signal responsive to the difference between said fourth signal and said fifth signal, wherein said sixth signal is scaled to be representative of the position of said pressure control valve in said first conduit means required to maintain the actual pressure represented by said fourth signal substantially equal to the desired pressure represented by said fifth signal; and
    means for manipulating said pressure control valve responsive to said sixth signal.

4. Apparatus in accordance with claim 1 additionally comprising:
    a transfer conduit means for passing liquid from a lower section of said first separation column to an upper section of said second separation column;
    a transfer conduit valve operably located in said transfer conduit; and
    means for controlling liquid flow through said transfer conduit means responsive to the liquid level in said first separation column.

5. Apparatus in accordance with claim 1, wherein said second separation column is provided with reboiler equipment operably connected to the lower portion and external reflux equipment operatively connected to the upper portion.

6. A method for controlling condensation of a gaseous hydrocarbon feedstream predominating in methane and containing heavier hydrocarbon components and a benzene contaminate, said method comprising;

(a) cooling said feedstream in a heat exchanger to a temperature sufficient to condense at least a benzene contaminate in said feedstream, and thereby producing a partially condensed stream;

(b) absorbing the benzene contaminate in said partially condensed stream in a first separation column and further separating liquid and vapor in said first separation column;

(c) withdrawing vapor in an overhead stream from said first separation column and a liquid in a bottoms stream from said first separation column;

(d) passing said liquid bottoms stream from said first separation column to an upper section of a second separation column, wherein liquid and vapor are separated in said second separation column;

(e) withdrawing an overhead vapor stream from said second separation column, and a bottom liquid stream from said second separation column; and (f) bypassing a portion of said feedstream around said heat exchanger, wherein the portion of said feedstream bypassed is responsive to the actual flow rate of vapor withdrawn in said overhead vapor stream of said second separation column.

7. A method in accordance with claim 6, wherein said heat exchanger is provided with a bypass conduit having a bypass control valve operably located therein, and wherein said step of bypassing a portion of said feed around said heat exchanger comprises:

establishing a first signal representative of the actual flow rate of vapor in said overhead vapor stream of said second separation column;

establishing a second signal representative of the desired flow rate of vapor in said overhead vapor stream of said second separation column;

comparing said first signal and said second signal and establishing a third signal responsive to the difference between said first signal and said second signal, wherein said third signal is scaled to be representative of the position of said bypass control valve required to maintain the actual flow rate in said overhead conduit represented by said first signal substantially equal to the desired vapor flow rate represented by said second signal; and manipulating said bypass control valve responsive to said third signal.

8. A method in accordance with claim 6 wherein said heat exchanger comprises an ethylene chiller in an LNG process, and said bottoms liquid stream withdrawn from said second separation column comprises NGL.

9. A method in accordance with claim 6 wherein a pressure control valve is operably located in said overhead vapor stream of said second separation column, said method additionally comprising:

establishing a fourth signal representative of the actual pressure of said overhead vapor stream withdrawn from said second separation column;

establishing a fifth signal representative of the desired pressure of said overhead vapor stream withdrawn from second separation column;

comparing said fourth signal and said fifth signal to establish a sixth signal responsive to the difference between said fourth signal and said fifth signal, wherein said sixth signal is scaled to be representative of the position of said pressure control valve required to maintain the actual pressure represented by said fourth signal substantially equal to the desired pressure represented by said fifth signal; and manipulating said pressure control valve responsive to said sixth signal.

10. A method in accordance with claim 6 additionally comprising:

reboiling liquid in lower portion of said second separation column; and providing an external reflux stream to the upper portion of said second separation column.

* * * * *